(12) United States Patent
Mai

(10) Patent No.: US 7,393,479 B2
(45) Date of Patent: Jul. 1, 2008

(54) INJECTION MOLDING THREE-WAY SHUT OFF VALVE

(75) Inventor: Arnold Mai, Irrel (DE)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 805 days.

(21) Appl. No.: 10/966,715

(22) Filed: Oct. 15, 2004

(65) Prior Publication Data

US 2006/0082029 A1    Apr. 20, 2006

(51) Int. Cl.
    *B29C 45/00* (2006.01)
(52) U.S. Cl. ............... 264/37.33; 264/39; 264/328.1; 425/557; 425/568
(58) Field of Classification Search ............ 264/37, 264/33, 39, 328.1, 37.33; 425/557–561, 425/568
    See application file for complete search history.

(56) References Cited

U.S. PATENT DOCUMENTS

| | | | | |
|---|---|---|---|---|
| 2,950,501 | A * | 8/1960 | Harkenrider | 425/146 |
| 4,140,238 | A | 2/1979 | Dawson | |
| 4,966,545 | A | 10/1990 | Brown et al. | |
| 5,017,127 | A * | 5/1991 | Majerus et al. | 425/549 |
| 5,540,580 | A * | 7/1996 | Takada | 425/539 |
| 5,605,707 | A * | 2/1997 | Ibar | 425/144 |
| 6,604,936 | B2 | 8/2003 | Boyd | |
| 7,284,979 | B2 * | 10/2007 | Mai | 425/569 |

FOREIGN PATENT DOCUMENTS

| | | |
|---|---|---|
| JP | 56-93528 | 7/1981 |
| JP | 56093528 A | 7/1981 |
| JP | 7-24877 * | 1/1995 |
| WO | WO 96/35568 A1 | 11/1996 |
| WO | WO 00/74920 A1 | 12/2000 |

OTHER PUBLICATIONS

International Search Report for PCT/CA2005/001497, dated Jan. 19, 2006, three pages, related to the above-identified US patent application.

* cited by examiner

*Primary Examiner*—Jill L Heitbrink

(57) ABSTRACT

An injection molding three way shut off valve assembly and method in which the three way valve assembly is configured to be disposed to control a flow of a molten material from an injection unit to a runner system. Preferably, the valve assembly has a valve plunger configured to be disposed between the injection unit and the runner system; the valve plunger having a flow-through channel and a purge channel. Movement structure is configured to control the position of the valve plunger between (i) a molten material flow position where the molten material flows through the flow-through channel, (ii) a molten material blocked position where the molten material is blocked from flowing through the flow-through channel, and (iii) a molten material purge position where the molten material flows through the purge channel, without disconnecting the injection unit from the runner system.

22 Claims, 9 Drawing Sheets

INJECTION MOLDING THREE-WAY SHUT OFF VALVE

BACKGROUND OF THE INVENTION

1. Field of the Invention

The present invention relates to an improved injection molding apparatus and method in which a three-way shut off valve can be controlled to allow molten material (i) to pass through the valve, (ii) to be blocked by the valve, or (iii) to be diverted to a purging channel. Preferably, the three-way shut off valve is used in conjunction with an articulated coupling which allows molten material to be transmitted between an injection unit and a hot runner system in a movable mold component. The valve may also be used with an injection nozzle to allow molten material to be transmitted between an injection unit and either a standard cold runner mold or a standard hot runner mold.

2. Description of Related Art

In some injection molding applications, shut-off valves are used to control the flow of the molten material from the injection unit to the hot runner system. Typically, the injection unit actually disengages from the mold in order to purge the molten material from a portion of the melt channel. Thus, the remaining molten material is exposed to contact with air after purging. This may cause surface defects on molded parts depending on material grade and surface quality requirements.

U.S. Pat. No. 4,140,238 to Dawson discloses a pneumatically driven plunger type shut off valve in an injection molding nozzle. The plunger has two positions—open and blocked. There is no disclosure, however, of a third position for the plunger.

Japanese Publication 56-93528 to Kouhei Koga discloses a piston driven plunger type shut off valve that acts as the injection channel conduit to the mold. The plunger contains the melt channel and connects to the shooting pot cylinder in the plunger's forward position. In the plunger's retracted position the melt passes around the plunger's exterior surface via a channel created by locally reducing the external diameter of the plunger. There is no disclosure of a third position for the plunger.

U.S. Pat. No. 4,966,545 to Brown discloses a hot runner shooting pot plunger that uses a first piston to actuate a first portion of its stroke, and a second piston coaxially aligned with the first piston to actuate a second portion of its stroke. The plunger is thereby controlled to move to each of three positions by the two pistons. The plunger does not act as a shut-off valve.

PCT publication WO 00/74920 to Catoen discloses a hot runner valve gate having a single valve stem movable to three distinct positions by two nested pneumatic pistons coaxially mounted at one end of the valve stem. In the first position the nozzle opens to permit flow of the material, in the second (intermediate) position the nozzle blocks the flow of the material, and in the third position the stem is extended through the gate orifice and projected forward to clear any blockage in the downstream melt channel. In the third position the melt channel is blocked by the stem and material cannot flow. There is no disclosure of using the valve to direct the material into a second channel when the third position is selected.

Thus, what is needed is an injection molding three way valve which can effectively and efficiently control the flow of melt so that it is provided to the hot runner, or shut off, or provided to a purging channel, all with minimal structure and time and within the operating environment of the injection molding machine.

SUMMARY OF THE INVENTION

It is an advantage of the present invention to provide a three-way shut off valve so that the injection unit can remain connected to the runner system during purging. As used herein, a "runner system" may be any one of, or a combination of: (i) a movable hot runner system which is coupled to the moving platen; (ii) a standard cold runner mold system where an unheated runner provides molten material to the mold; and (iii) a standard hot runner mold system where a heated runner provides molten material to the mold.

According to a first aspect of the present invention, a unique combination of structure and/or steps is provided for an injection molding three way valve assembly configured to be disposed to control a flow of a molten material from an injection unit to a runner system. The valve assembly has a valve plunger configured to be disposed between the injection unit and the runner system; the valve plunger having a flow-through channel and a purge channel. Structure is configured to control the position of the valve plunger between (i) a molten material flow position where the molten material flows through the flow-through channel, (ii) a molten material blocked position where the molten material is blocked from flowing through the flow-through channel, and (iii) a molten material purge position where the molten material flows through the purge channel, without disconnecting the injection unit from the runner system.

According to a second aspect of the present invention, a unique combination of structure and/or steps is provided for controlling a flow of molten material between an injection unit and a runner system. A valve stem configured to move within a valve housing between a molten material flow position, a molten material block position, and a molten material purge position. The valve stem is configured so that the valve stem is moved to the molten material purge position without disconnecting the injection unit from the runner system.

According to a third aspect of the present invention, a unique combination of structure and/or steps is provided for controlling the flow of a melt between an injection unit and a runner system. A distributor block is configured to be disposed between the injection unit and the runner system, and has a melt channel therein. A valve piece is disposed in the distributor block and is configured to be movable between a melt flow position, a melt block position, and a melt purge position. The valve piece has a flow channel configured to permit the melt to flow from the block melt channel to the runner system. The valve piece also has a purge channel configured to permit the melt to flow from the distributor block melt channel to an outside of the distributor block, without disconnecting the distributor block from any one of the injection unit and the runner system.

According to a fourth aspect of the present invention, a unique combination of steps is provided for a method for controlling a flow of molten material between (i) an injection unit and a runner system. A valve device is disposed in a melt channel between the injection unit and the runner system. The valve device is moved to a molten material flow position to cause molten material to flow from the injection unit to the runner system. The valve device can also be moved to a molten material block position to cause molten material to be blocked from flowing from the injection unit to the runner system. The valve device is also movable to a molten material purge position to cause molten material to be purged from the valve device. The purging step being performed while the injection unit is coupled to the runner system.

BRIEF DESCRIPTION OF THE DRAWINGS

Exemplary embodiments of the presently preferred features of the present invention will now be described with reference to the accompanying drawings.

DETAILED DESCRIPTION OF THE PRESENTLY PREFERRED EXEMPLARY EMBODIMENTS

1. Introduction

The present invention will now be described with respect to several embodiments in which a plastic injection molding machine injects two different plastic melts into a mold through two different hot runner systems. The second injection unit is mounted to a movable portion of the mold, and is supplied with the second plastic melt through an articulated coupling which maintains a good seal throughout its operating environment. A three-way valve is disposed adjacent the articulated coupling, and is controlled to allow the plastic melt (i) to pass through the valve, (ii) to be blocked by the valve, or (iii) to be diverted to a purging channel. Thus, the injection unit does not have to be disconnected from the mold to purge the injection unit. However, the present invention will also find applicability in any injection molding process (including thixomolding), which may benefit from being able to control a melt between a flow position, a blocked position, and a purge position without exposing the molten material in the melt channel to ambient air.

2. The Structure of the Preferred Embodiments

Figure 1:
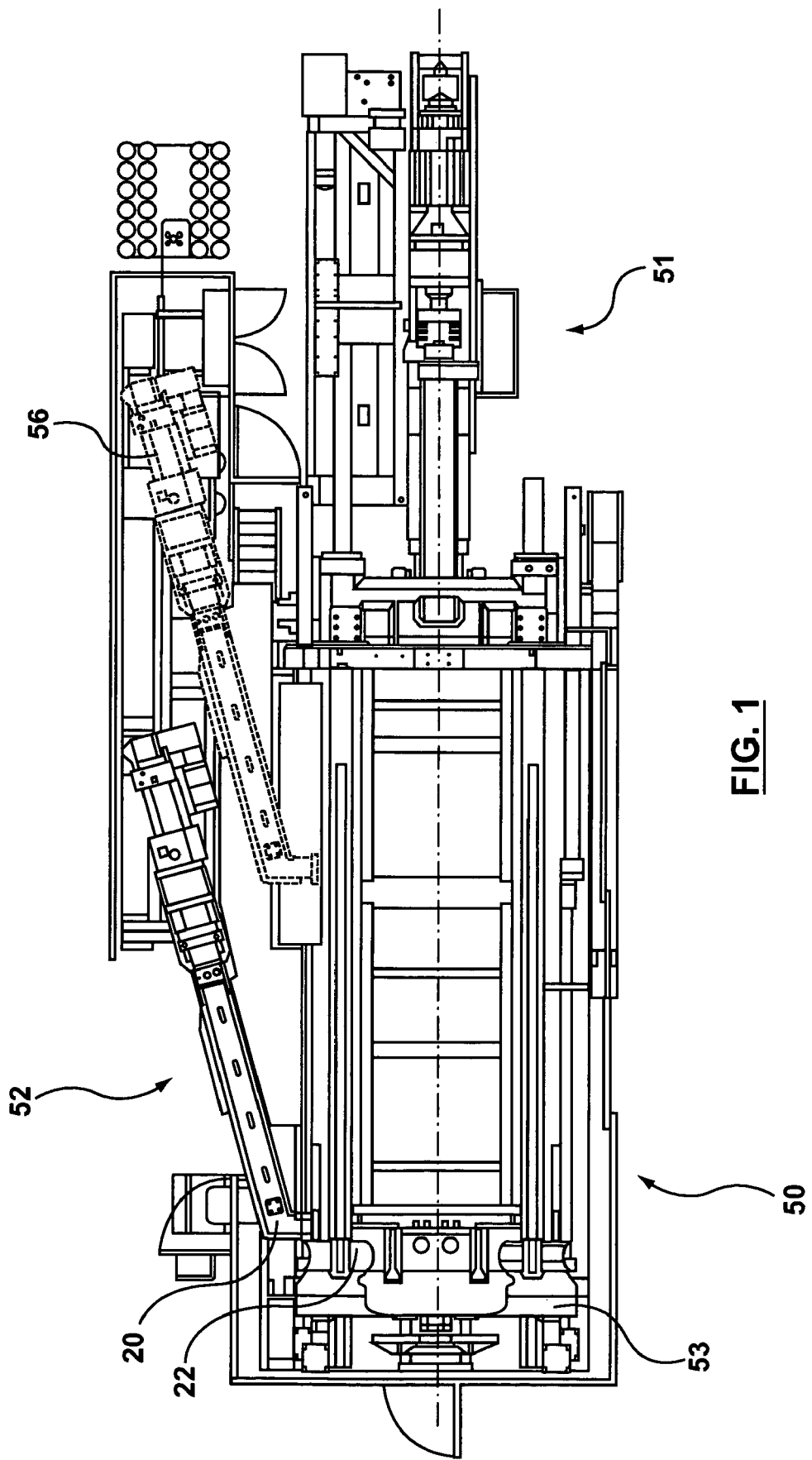
FIG. 1 is a schematic plan view of a multi-material injection molding machine according to a preferred embodiment of the present invention.
Figures 2, 3:
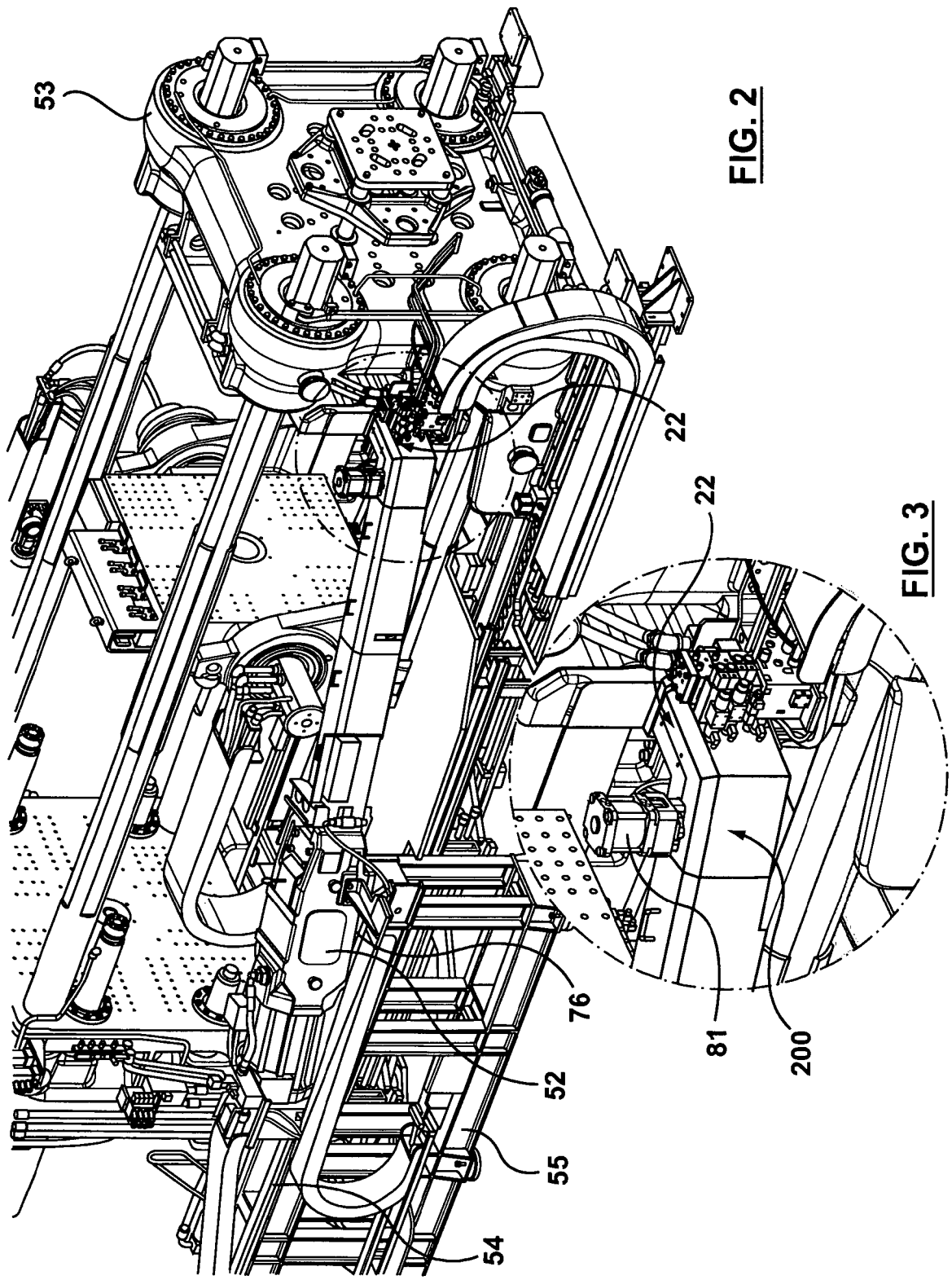
FIG. 2 is a perspective view of the multi-material injection molding machine according to a preferred embodiment according to the present invention.
FIG. 3 is a close-up perspective view of the articulated joint location according to a preferred embodiment according to the present invention.

FIGS. 1-3 are schematic and perspective views of a multi-material plastic injection molding machine comprising a clamp unit 50, a first injection unit 51, and a second injection unit 52. The second injection unit 52 is bolted to a distributor block 20 that is bolted to a hot runner 22 that is, in turn, attached to the moving platen 53. FIG. 2 shows that the second injection unit 52 is mounted on a carriage assembly 76 that includes a subplate that rides on four linear bearings. The linear bearings are mounted on linear rails 54 that are attached to the second injection unit base 55. As the moving platen 53 moves from its mold open position (as shown in FIG. 1) to its mold closed position, it moves the second injection unit 52 linearly along with it. The mold closed position for the second injection unit is shown at 56 of FIG. 1. Consequently, the connection between the second injection unit 52, the distributor block 20, and the hot runner 22 must be robust enough to transmit these forces of motion while accommodating any variations in alignment between the track of the moving platen 53 and the linear rails 54 that may be caused by thermal expansions, misalignments, shock, vibration, dirt, etc.

Figure 4:
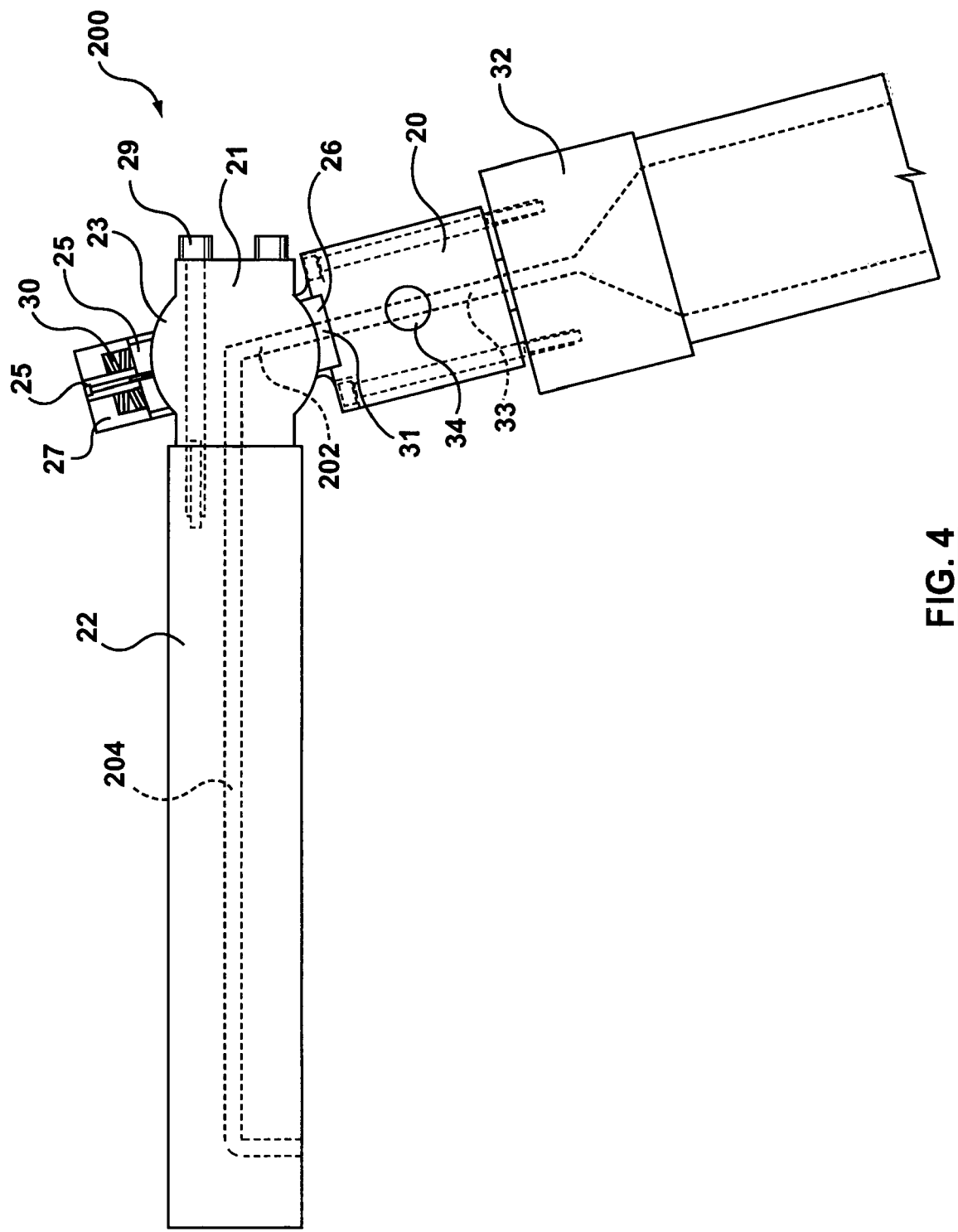
FIG. 4 is a schematic plan view of the injection unit connection to the distributor and hot runner in the FIG. 1 embodiment.

FIG. 4 shows a hot runner extension 21 attached to the end of the hot runner 22 and connected to the distributor block 20, as described in copending U.S. patent application Ser. No. (not yet assigned) entitled SELF ALIGNING INJECTION APPARATUS AND METHOD (Reference No. H-812). In more detail, FIG. 4 shows the distributor block 20, that is preferably bolted to the end of the hot runner 22 with a movable sealed connection 200. Preferably, the movable sealed connection 200 comprises a hot runner extension 21 bolted to the hot runner 22 with bolts 29, a hot runner extension melt channel 202, and has opposed spherical surfaces 23 and 24. These spherical surfaces 23 and 24 are configured so as to mate with concave pads 25 and 26 that are, respectively, disposed between a cap 27 (that is bolted to the distributor block 20 with screws 28) and the distributor block 20. Preferably, each of the concave pads is made of H13 steel, and is 80 mm in diameter, and 40 mm thick. Of course other materials and configurations may be provided, such as ceramic and any steel or copper alloys. The pads may be bolted to their seat or just be held by compression force from the spring package. Preferably, each of the spherical surfaces 23, 24 is made of H13 steel, and comprises a hemispherical shape having a diameter of 120 mm. Of course, other flexible connections such as an interface part of cylindrical shape or melt channel connection with a "thin" wall tubing may be provided to ensure a movable yet sealable connection between the hot runner 22 and the injection unit barrel head 32.

A spring pack 30 is disposed to urge the concave pad 25 to press the hot runner extension 21 against the concave pad 26, thereby maintaining a good seal at the interface of the concave pad melt channel 31, which passes through the concave pad 26. The molten material thus moves from the injection unit barrel head 32, through the distributor block melt channel 33, through the concave pad melt channel 31, through the hot runner extension melt channel 202, and into the hot runner melt channel 204. Alternatively, the above-described structure and function may be applied to a standard injection cold runner mold, or a standard injection hot runner mold. As noted above, in all of these embodiments, the three way valve is used in conjunction with a "runner system."

Figure 5:
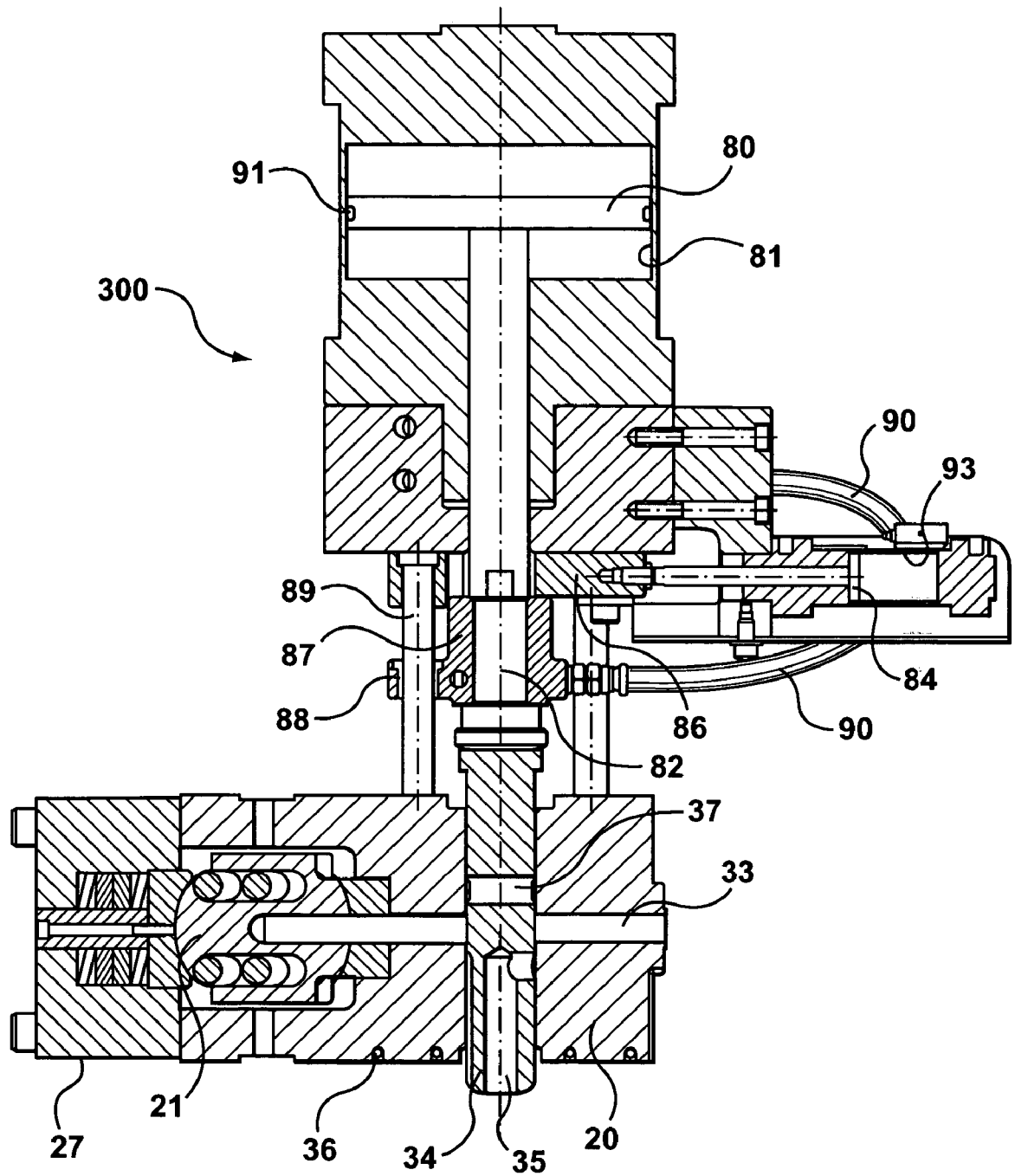
FIG. 5 is a cross section view of the distributor block showing the plunger in the blocked position in the FIG. 1 embodiment.
Figure 6:
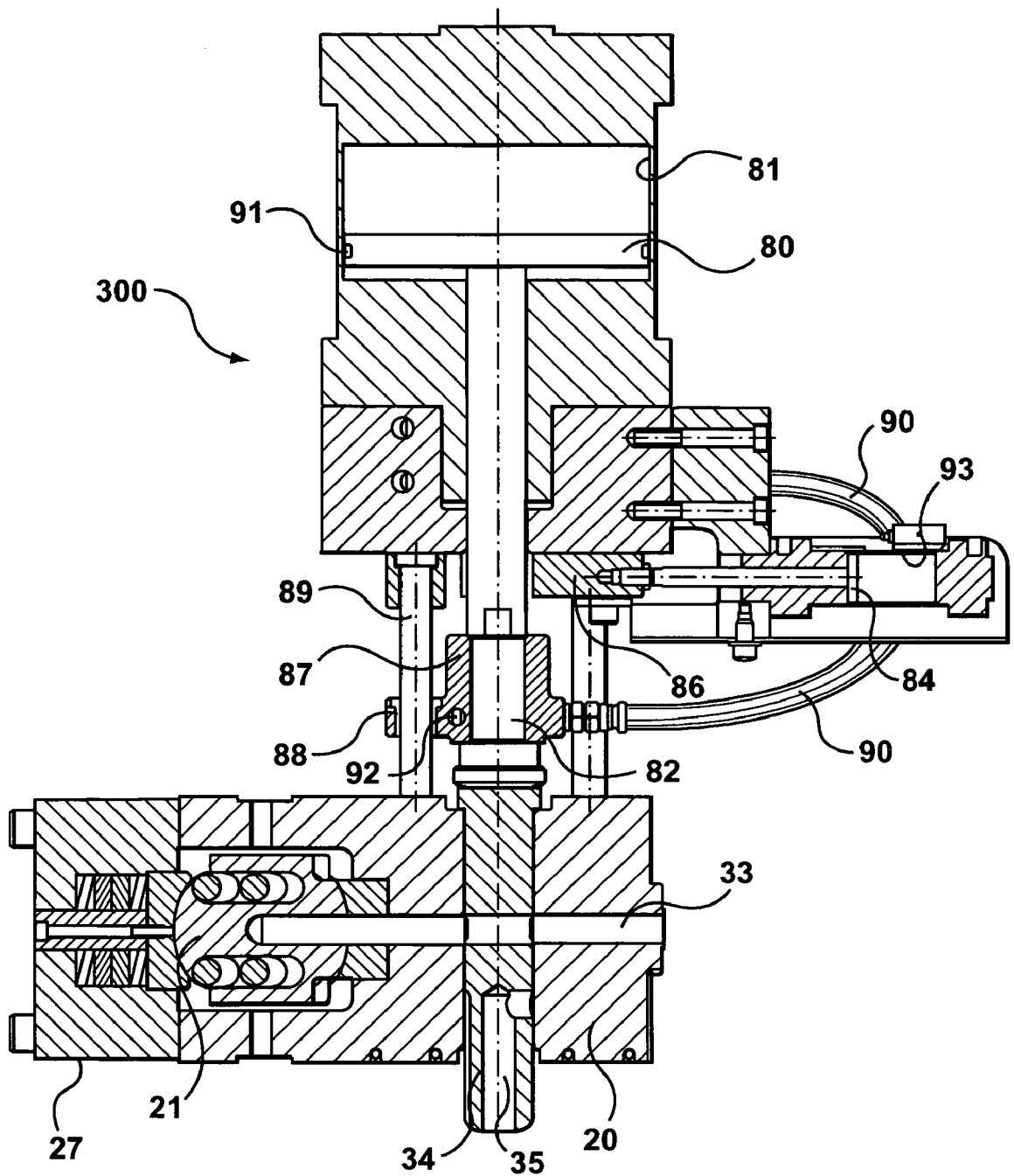
FIG. 6 is a cross section view of the distributor block showing the plunger in the open position in the FIG. 1 embodiment.
Figure 7:
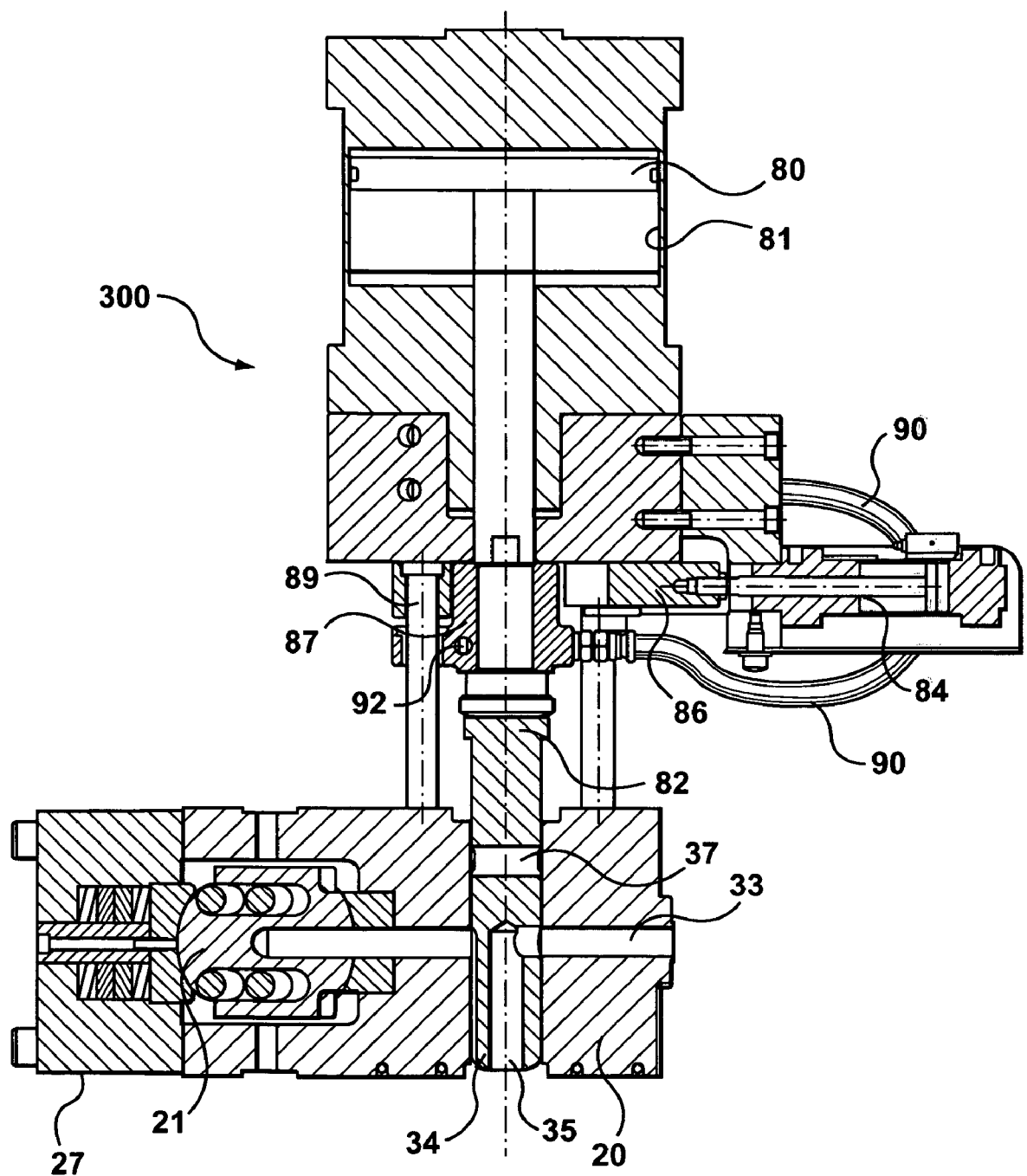
FIG. 7 is a section view of the distributor block showing the plunger in the purging position in the FIG. 1 embodiment.

FIGS. 5-7 show a distributor block 20 that includes a three position shut off valve plunger (or stem) 34 that is configured to allow the molten material (i) to pass through the valve to the runner system, (ii) to be blocked by the valve, or (iii) to be diverted to a purging channel 35, depending upon the plunger's position. Preferably, the distributor block 20 serves as the valve housing. The plunger 34 has a flow-through channel 37 and a purging channel 35. Preferably, the purging channel 35 is configured with a ninety degree turn therein in order to direct the molten material in a direction substantially perpendicular to a direction of melt flow. Of course, the size, shape, and location of the channels may be varied, depending upon the application. Preferably, the distributor block 20 is heated conventionally with tubular heaters 36 or the like. Also preferably, the plunger 34 and the movable sealed connection 200 are provided in a single, compact unit that may be readily installed between the injection unit and the hot runner.

To control the operation of the three position shut off valve plunger 34, a valve control assembly 300 is provided. Preferably, the valve control assembly 300 includes a first cylinder 81 which contains a first pneumatic piston 80 that moves the plunger 34 by means of a rod extension 82. FIG. 5 shows the plunger 34 in the intermediate, blocked position such that the molten material in the distributor block melt channel 33 cannot flow toward the hot runner 22. FIG. 6 shows the plunger 34 in the lowest, hot runner position where the molten material in the distributor block melt channel 33 is allowed to flow through the hot runner extension 21 to the hot runner 22. FIG. 7 shows that the first piston 80 has moved toward the top of its stroke in the first cylinder 81, thereby moving the plunger 34 to its uppermost, purge position, that aligns the purging channel 35 inside the plunger with the channel 33, thereby allowing the injection unit to purge the molten material through the purging channel 35.

The valve control assembly 300 preferably includes a second pneumatic piston 84 (operating in a second cylinder 93) and connected to a spacer block 86 that is slidably mounted beneath the first cylinder 81. In FIGS. 5 and 6, the second piston 84 positions the spacer block 86 to partially block the travel of the first piston 80 and its rod extension 82 such that the plunger 34 can only travel between its open channel position (shown in FIG. 6) and its closed channel position (shown in FIG. 5). In FIG. 7, the second piston 84 has been actuated to withdraw the spacer block 86 so that it no longer blocks the travel of the first piston 80, thereby allowing the plunger 34 to be moved to the purging position.

Alternate drive means, such as electric servo drives, stepper motors, or hydraulic actuators can be used to control the movements of the first and/or second pistons, instead of the pneumatic pistons described above, or to replace the two pneumatic pistons with a single actuator.

Rod extension 82 is preferably surrounding by a cooling block 87 that has bearings 88 that allow it to slide on standoffs 89 and remain in contact with the rod extension 82 through its entire stroke. Hoses 90 supply a coolant to the block 87 and its cooling channel 92 to remove the heat conducted to the rod extension 82 from the plunger 34, so that the heat conducted to the first piston 80 is minimized, thereby optimizing the service life of its seals 91. The cooling block 87 also helps limit heat conducted to the spacer block 86 when it is at its engaged position thereby minimizing heat conducted via the spacer block 86 to the piston 84, thereby optimizing the service life of its seals (not shown).

The operation of the first and second pneumatic pistons is controlled by a controller 400, which activates various pumps and valves to provide the appropriate air pressure to the pistons in a manner well known in the art. The controller 400 (which may be integrated as part of the injection molding machine) controls all timing and actuation sequences for the valve operation. Preferably, the controller comprises one or more processors, general purpose computers, Application Specific Processors, Digital Signal Processors, hard-wired circuitry, etc., with sufficient memory (ROM, RAM, disk, CD, etc.) to process one or more software programs containing code for carrying out the functions described herein.

Figure 8:
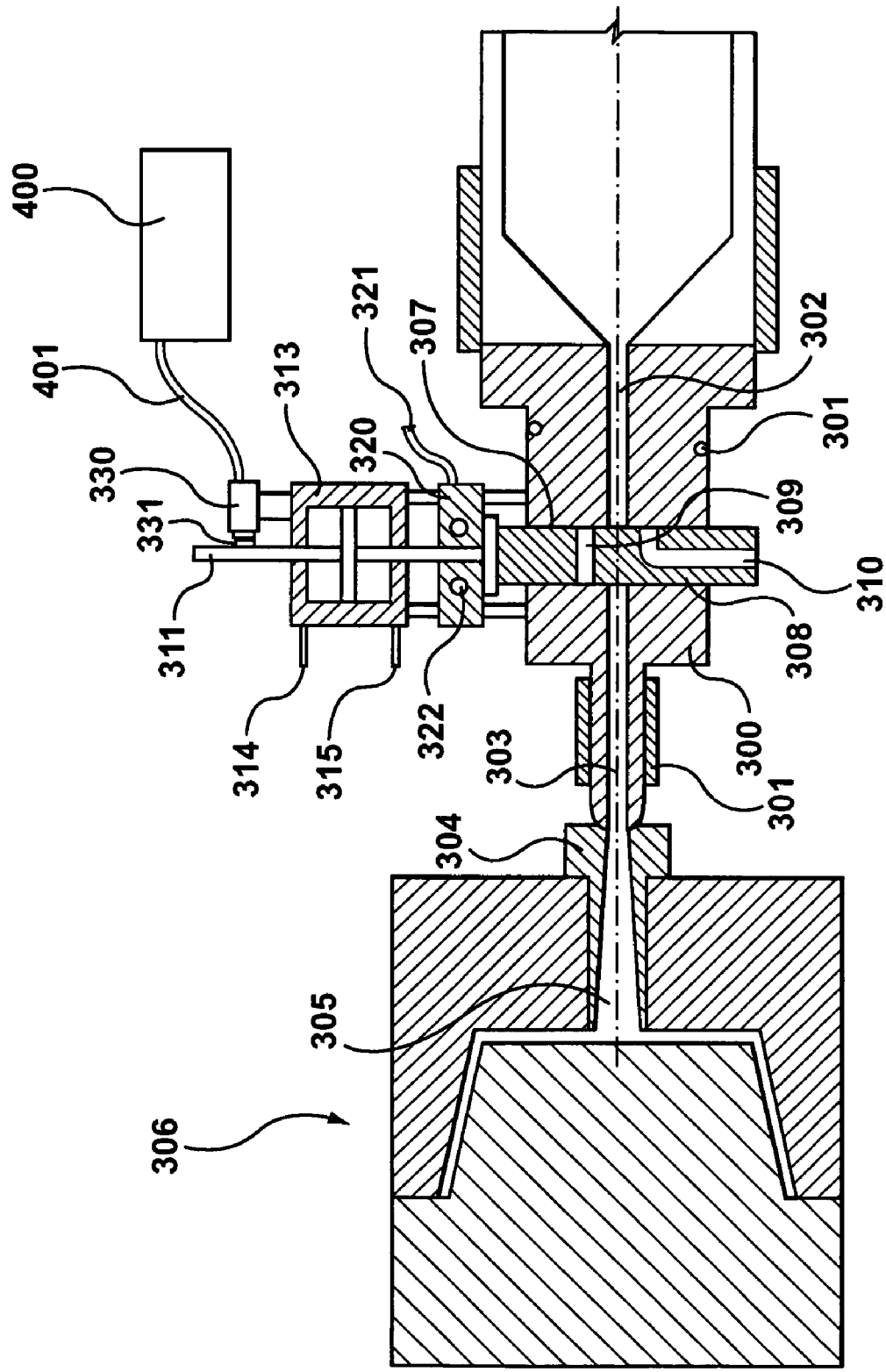
FIG. 8 is a cross section view of the distributor block showing the plunger in the blocked position in an alternative embodiment according to the present invention.
Figure 9:
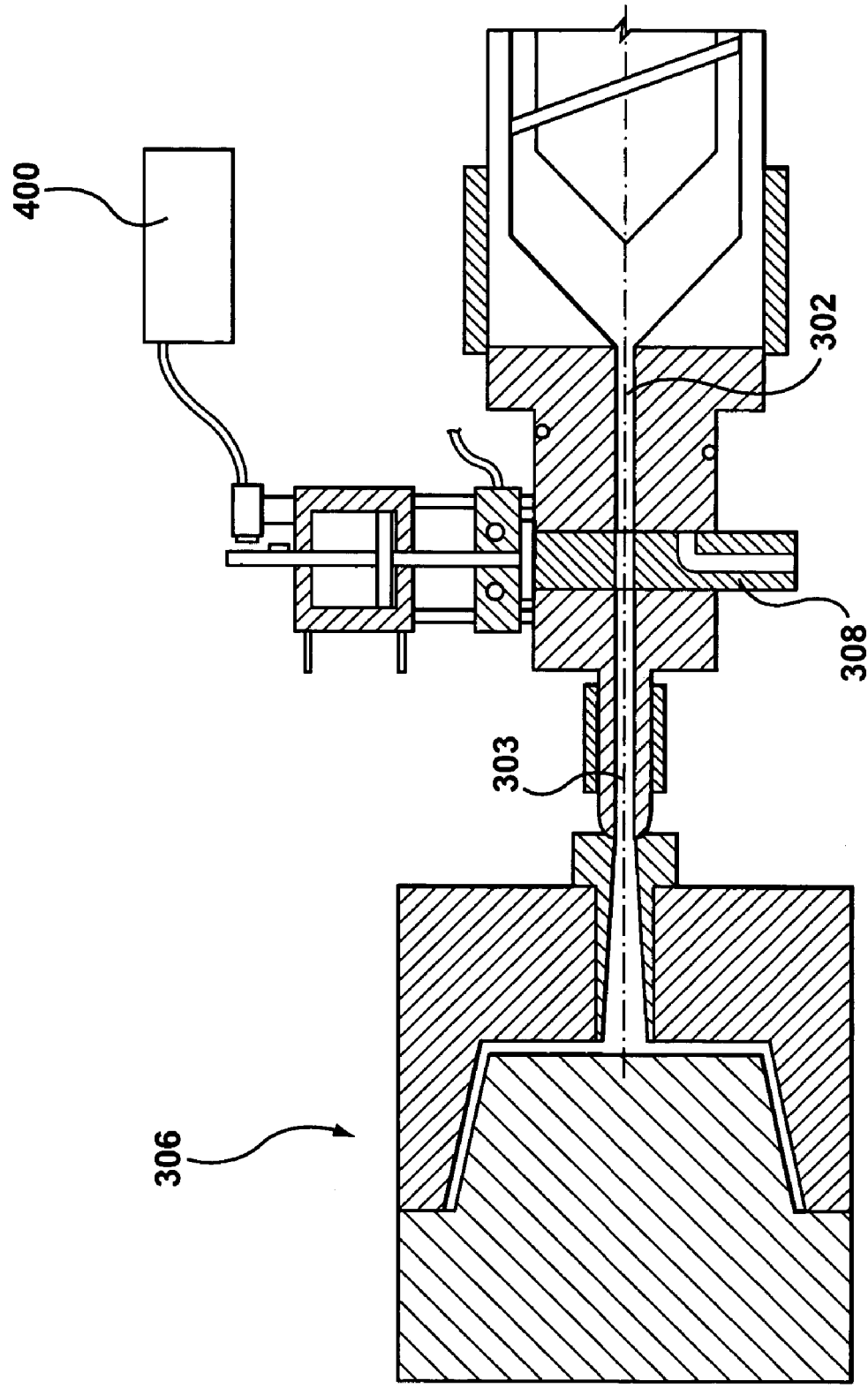
FIG. 9 is a cross section view of the distributor block showing the plunger in the open position in the FIG. 8 embodiment.
Figure 10:
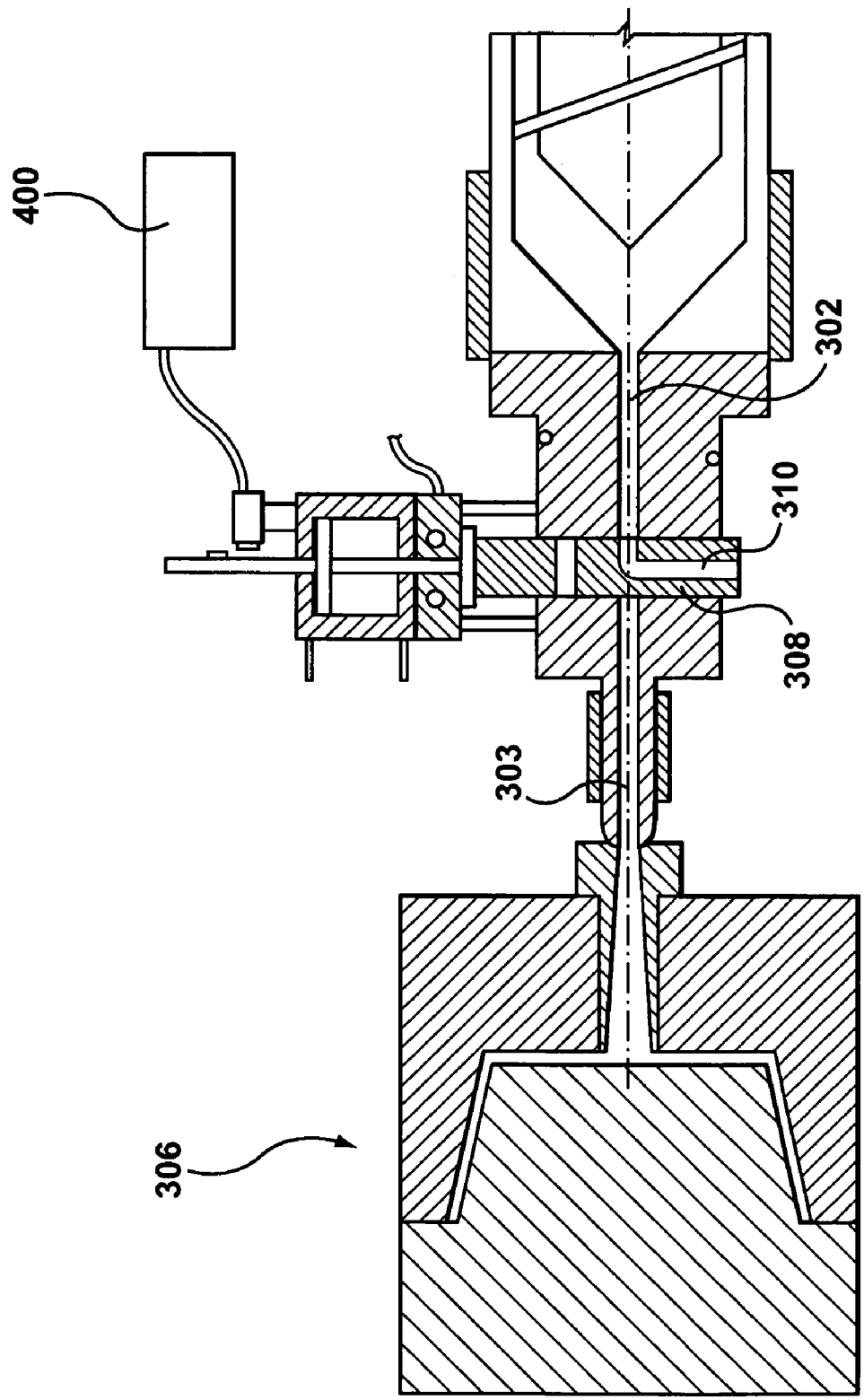
FIG. 10 is a section view of the distributor block showing the plunger in the purging position in the FIG. 8 embodiment.

FIGS. 8-10 show an alternate embodiment in which a three-way valve is configured in a standard injection unit nozzle assembly that is connected to a cold runner mold (Of course, similar structure would be used with a standard hot runner mold.) FIG. 8 shows the three-way valve in the closed position blocking flow of material from the injection unit to the mold. The nozzle assembly comprises a distributor body 300 (heated by heaters 301) that includes (i) a first melt passage 302 and (ii) a second melt passage 303 that is in fluid communication with the cold runner melt passage 305 that is contained in a sprue bushing 304 that is part of standard cold runner mold 306. The distributor body 300 also contains a through bore (or valve housing) 307 that intersects the first and second melt passages 302 and 303. Inside the bore 307 rides a plunger 308 in a sliding fit of such tolerance that leakage of material is minimized at operating temperature.

Preferably, the plunger 308 contains a transverse through bore (or flow-through channel) 309 having substantially the same diameter as the first melt passage 302. Preferably, the plunger 308 also has a purging channel 310 that is partially coaxial with the plunger's cylindrical axis having substantially the same diameter as the first melt passage 302. The uppermost end of the plunger 308 is preferably connected to a shaft 311 that is fastened to an actuator piston 312 configured in a hydraulic cylinder 313 having ports 314 and 315 such that the admission of pressurized fluid through one of said ports causes the piston 312 to move within the confines of the cylinder 313 thereby moving shaft 311 and plunger 308. A cooling block 320 surrounds a lower portion of shaft 311 and touches the uppermost face of the plunger 308 such that heat can be conducted from the plunger 308 to the cooling block 320 and be removed by a cooling fluid circulated via hoses 321 through cooling channels 322. Preferably, the cooling block is coupled to the shaft 311 and travels with it as it moves.

Preferably, a conventional proxy sensor 330 is mounted atop the cylinder 313 and senses the position of a flag 331 that is attached to the shaft 311 such that the sensor detects the flag when the piston 312 has moved the shaft 311 and the plunger 308 to a position in which the plunger blocks the flow of material in first melt channel 302, as shown in FIG. 8. The sensor signal is conducted to the controller 400 by conduits 401. The controller 400 controls the machine and hydraulic actuation of piston 312, thereby coordinating the piston position with the actions of the injection unit.

FIG. 9 shows the plunger 308 in the open position, permitting flow of material from the first melt channel 302 to the second melt channel 303 and thereafter to fill the mold 306. FIG. 10 shows the plunger 308 in the purging position whereby the injection unit can be emptied by conveying melt via the first melt channel 302 and the purging channel 310 in the plunger.

The stroke of the hydraulic piston 312 is configured such that the cooling block 320 may also act as a stop block ensuring that the open channel 309 and the purging channel 310 are substantially aligned with the first melt channel 302 when the cooling block 320 contacts the distributor body 300 (in the lower position) and when the cooling block 320 contacts the underside of the cylinder 313 (in the upper position). The position of the plunger that blocks the flow from the first melt channel 302 does not need to be very accurate since there is no requirement to align a hole in the plunger with the first melt channel 302. Consequently, a relatively inaccurate method can be utilized for controlling the blocking position of the plunger, namely the proxy sensor 330 and flag 331, can be successfully employed without incurring a large cost.

3. The Operation of the Preferred Embodiments

In operation, the controller 400 causes the first piston 80 and the second piston 84 to move the valve plunger 34 to the valve open position depicted in FIG. 6, in order to permit the melt to flow through the hot runner extension 21 to the hot runner 22. After injecting a shot of melt, the controller 400 causes the first piston 80 and the second piston 84 to move the valve plunger 34 to the valve closed position depicted in FIG. 5, in order to prevent the melt from flowing through the hot runner extension 21. At the end of the molding operation, when it is desired to purge the melt from the injection unit melt channel, the controller 400 causes the second piston 84 to withdraw the spacer block 86 from blocking the travel of the first piston 80, in order to move the valve plunger 34 to the valve purge position depicted in FIG. 7. In this position, the melt can be purged from the injection unit melt channel, and the mold is prepared to introduce another melt to the hot runner. Since the plunger 34 has a purging channel 35 disposed therein, the purging can be accomplished without disconnecting the injection unit during the mold purging operation. Of course, a similar method is adopted with respect to the embodiments described above with respect to FIGS. 8-10.

4. Conclusion

Advantageous features according to the present invention may include:

A three position plunger shut off valve in an injection molding distributor block.

An injection unit that remains connected to a hot runner during a purging operation.

Thus, what has been described is a method and apparatus for an injection molding three way valve which can effectively and efficiently control the flow of melt without requiring the injection unit to be disconnected from the runner system during purging.

The individual components shown in outline or designated by blocks in the attached Drawings are all well-known in the injection molding arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

All U.S. patent documents discussed above are hereby incorporated by reference into the Detailed Description of the Preferred Embodiment.

What is claimed is:

1. An injection molding three way valve assembly configured to be disposed to control a flow of a molten material from an injection unit to a runner system, said injection molding three way valve assembly comprising:

a valve plunger configured to be disposed between the injection unit and the runner system, said valve plunger having a flow-through channel and a purge channel; and structure configured to control the position of said valve plunger between (i) a molten material flow position where the molten material flows through the flow-through channel, (ii) a molten material blocked position where the molten material is blocked from flowing through the flow-through channel, and (iii) a molten material purge position where the molten material flows through the purge channel, without disconnecting the injection unit from the runner system, said structure configured to control including:

a first piston configured to move said valve plunger between the molten material flow position, the molten material blocked position, and the molten material purge position;

a controller configured to control movement of said first piston;

a second piston configured to reduce the movement of said first piston in the molten material flow position and the molten material blocked position, and said controller is configured to control the movement of said second piston.

2. The injection molding three way valve assembly according to claim 1, wherein said purge channel is configured to direct the molten material in a direction substantially perpendicular to a direction of the flow of the molten material.

3. The injection molding three way valve assembly according to claim 1, wherein said valve plunger is disposed in a distributor block coupled between the injection unit and the runner system.

4. The injection molding three way valve assembly according to claim 1 wherein said first piston comprises a rod extension configured to actuate said valve plunger, and wherein said second piston is configured to press a spacer block against said rod extension to control the movement of said first piston.

5. The injection molding three way valve assembly according to claim 4, further comprising a cooling structure configured to cool said rod extension.

6. The injection molding three way valve assembly according to claim 1, wherein said valve plunger is disposed in a distributor block coupled between the injection unit and the runner system, and further comprising a first cylinder configured to hold said first piston, said first cylinder being fixedly coupled to said distributor block.

7. The injection molding three way valve assembly according to claim 1, further comprising a distributor block coupled between the injection unit and the runner system, wherein said distributor block includes a self aligning articulated joint, and wherein said valve plunger is disposed adjacent said self aligning articulated joint.

8. The injection molding three way valve assembly according to claim 1, wherein the runner system comprises a movable hot runner.

9. The injection molding three way valve assembly according to claim 1, wherein the runner system comprises a standard cold runner.

10. The injection molding three way valve assembly according to claim 1, wherein the runner system comprises a standard hot runner.

11. An apparatus for controlling a flow of molten material between an injection unit and a runner system, the apparatus comprising:

a valve housing; and a valve stem configured to move within said valve housing between a molten material flow position, a molten material block position, and a molten material purge position, said valve stem being configured so that the valve stem is moved to the molten material purge position without disconnecting the injection unit from the runner system wherein:

said valve stem has a flow-through channel and a purge channel, and further comprising movement structure configured to move the valve stem between the molten material flow position, the molten material block position, and the molten material purge position, said movement structure comprises:

a first piston configured to move said valve stem between the molten material flow position, the molten material block position, and the molten material purge position;

a controller configured to control movement of said first piston; and a second piston configured to reduce the movement of said first piston in the molten material flow position and the molten material block position, and wherein said controller is configured to control the movement of said second piston.

12. The apparatus according to claim 11, wherein the runner system comprises a movable hot runner.

13. The apparatus according to claim 11, wherein the runner system comprises a standard cold runner.

14. The apparatus according to claim 11, wherein the runner system comprises a standard hot runner.

15. The apparatus for controlling a flow of a melt between (i) an injection unit and a runner system the apparatus comprising:

a block configured to be disposed between the injection unit and the runner system, and having a melt channel therein;

a valve piece disposed in said block and configured to be movable between a melt flow position, a melt block position, and a melt purge position, said valve piece having a flow channel configured to permit the melt to flow from the block melt channel of the block to the runner system, said valve piece having a purge channel configured to permit the melt to flow from the melt channel of the block to an outside of said block, without disconnecting said block from any one of the injection unit and the runner system; and movement structure configured to move the valve piece between the melt flow piston, the melt block position, and the melt purge position, said movement structure comprising:

a first piston configured to move said valve piece between the melt flow position, the melt block position, and the melt purge position;

a second piston configured to reduce movement of said first piston in the melt flow position and the melt block position; and a controller configured to control the movement of said first piston and said second piston.

16. The apparatus according to claim 15, wherein said first piston and said second piston comprise pneumatic pistons.

17. The apparatus according to claim 15, further comprising:

an articulated joint disposed in said block and configured to transmit the melt from the melt channel of the block to mold runner.

18. The apparatus according to claim 17, wherein said articulated joint comprises:

a joint having a first spherical surface and a second spherical surface and a joint melt channel therein, said joint being substantially fixedly coupled to one of the block and the runner system; and a first concave pad and a second concave pad respectively in contact with said first spherical surface and said second spherical surface are configured to be movable with respect thereto, at least one of said first ad and said second concave pad being substantially fixedly coupled to the other one of the block and the runner system, said at least one of said first concave pad and said second concave pad having a pad melt channel configured to be in fluid communication with said joint melt channel of said joint.

19. The apparatus according to claim 18 wherein said joint is configured to articulate up to substantially fifteen degrees with respect to said first concave pad and said second concave pad.

20. The apparatus according to claim 15, wherein the runner system comprises a movable hot runner.

21. The apparatus according to claim 15, wherein the runner system comprises a standard cold runner.

22. The apparatus according to claim 15, wherein the runner system comprises a standard hot runner.

* * * * *